United States Patent
Blacka et al.

(10) Patent No.: US 9,961,110 B2
(45) Date of Patent: May 1, 2018

(54) SYSTEMS AND METHODS FOR PRE-SIGNING OF DNSSEC ENABLED ZONES INTO RECORD SETS

(71) Applicant: VERISIGN, INC., Reston, VA (US)

(72) Inventors: David Blacka, Reston, VA (US); Ramakant Pandrangi, Vienna, VA (US)

(73) Assignee: VERISIGN, INC., Reston, VA (US)

( * ) Notice: Subject to any disclaimer, the term of this patent is extended or adjusted under 35 U.S.C. 154(b) by 178 days.

(21) Appl. No.: 14/092,528

(22) Filed: Nov. 27, 2013

(65) Prior Publication Data

US 2014/0282847 A1  Sep. 18, 2014

Related U.S. Application Data

(60) Provisional application No. 61/800,405, filed on Mar. 15, 2013.

(51) Int. Cl.
  *G06F 17/00* (2006.01)
  *H04L 29/06* (2006.01)
  *H04L 29/12* (2006.01)

(52) U.S. Cl.
  CPC .......... *H04L 63/20* (2013.01); *H04L 61/1511* (2013.01); *H04L 63/12* (2013.01); *H04L 63/0823* (2013.01)

(58) Field of Classification Search
  CPC ..... H04L 63/20; H04L 61/1511; H04L 63/12; H04L 63/0823
  (Continued)

(56) References Cited

U.S. PATENT DOCUMENTS

| 4,164,078 A * | 8/1979 | Goldfarb | G09B 7/06 434/201 |
|---|---|---|---|
| 7,930,428 B2 * | 4/2011 | Drako | G06F 15/173 709/245 |

(Continued)

FOREIGN PATENT DOCUMENTS

| CN | 103379116 A | 10/2013 |
|---|---|---|
| WO | 00/65511 A2 | 11/2000 |

(Continued)

OTHER PUBLICATIONS

Nathan Meyer and Cricket Liu, F5 and Infoblox DNS Integrated Architecture: Offering a Complete Scalable, Secure DNS Solution, pp. 1-18, Mar 26, 2010.*

(Continued)

*Primary Examiner* — Luu Pham
*Assistant Examiner* — Canh Le
(74) *Attorney, Agent, or Firm* — Artegis Law Group, LLP

(57) ABSTRACT

Implementations relate to systems and methods for pre-signing of DNSSEC enabled zones into record sets. A domain name system (DNS) can receive and/or impose a set of DNS policies desired by an administrator, or the DNS operator itself to govern domain name resolution with security extensions (DNSSEC) for a Web domain. The DNS can generate a set of answers to user questions directed to the domain based on the set of policies. Those answers which differ or vary based on policy rules can be stored as variant answers, and can be labeled with a variant ID. The variant answers can be pre-signed and stored in the DNS. Because key data and other information is generated and stored before a DNS request is received, the requested variant answer can be returned with greater responsiveness and security.

24 Claims, 4 Drawing Sheets

(58) Field of Classification Search
USPC .......................................................... 726/1
See application file for complete search history.

(56) References Cited

U.S. PATENT DOCUMENTS

| | | | |
|---|---|---|---|
| 8,347,100 | B1 | 1/2013 | Thornewell et al. |
| 2008/0133908 | A1* | 6/2008 | Parkinson ............ H04L 63/0823 713/158 |
| 2008/0260160 | A1 | 10/2008 | Moreau |
| 2009/0187649 | A1 | 7/2009 | Migault et al. |
| 2009/0222583 | A1 | 9/2009 | Josefsberg et al. |
| 2010/0077462 | A1* | 3/2010 | Joffe ...................... H04L 63/126 726/5 |
| 2010/0131646 | A1 | 5/2010 | Drako |
| 2010/0281112 | A1 | 11/2010 | Plamondon |
| 2011/0225284 | A1* | 9/2011 | Savolainen ....... H04L 29/12066 709/223 |
| 2011/0321139 | A1 | 12/2011 | Jayaraman et al. |
| 2012/0017090 | A1 | 1/2012 | Gould et al. |
| 2012/0110334 | A1 | 5/2012 | Rossi |
| 2012/0117621 | A1* | 5/2012 | Kondamuru et al. ............ 726/3 |
| 2012/0155646 | A1 | 6/2012 | Seshadri et al. |
| 2012/0166806 | A1 | 6/2012 | Zhang et al. |
| 2012/0278335 | A1 | 11/2012 | Bentkofsky et al. |
| 2012/0278626 | A1 | 11/2012 | Smith et al. |
| 2012/0303808 | A1* | 11/2012 | Xie ............................... 709/225 |

FOREIGN PATENT DOCUMENTS

| | | |
|---|---|---|
| WO | 2008114209 A1 | 9/2008 |
| WO | 2011153539 A1 | 12/2011 |

OTHER PUBLICATIONS

Geoff Huston, "The ISP Column A monthly column on thing Internet," Jun. 2010, pp. 1-24.*
Peter Silva, "F5 Technical Brief, DNSSEC: THe Antidote to DNS Cache Poisoning and Other DNS attacks," 2009, p. 1-10.*
J. Gersch et al., "Deploying DNS Security (DNSSEC) in Large-Scale Operational Environments", Conference for Homeland Security, 2009, CATCH '09, Cybersecurity Applications & Technology, Mar. 3-4, 2009, pp. 169-180.
Suresh Krishnaswamy et al., "DNSSEC in Practice: Using DNSSEC-Tools to Deploy DNSSEC", Conference for Homeland Security, 2009, CATCH '09, Cybersecurity Applications & Technology, 2009, pp. 3-15.
Hao Yang et al., "Deploying Cryptography in Internet-Scale Systems: A Case Study on DNSSEC", IEEE Transactions on Dependable and Secure Computing, vol. 8, Issue 5, Digital Object Identifier: 10.1109/TDSC.2010.10, Published 2011, pp. 656-669.
R. Arends et al., "DNS Security Introduction and Requirements" The Internet Society, RFC 4033, Mar. 2005, pp. 1-21.
Extended European Search Report dated Feb. 20, 2015, European Application No. 14160038.7 filed Mar. 14, 2014, pp. 1-12.

* cited by examiner

| Variant ID | Owner Name | Class | Type | Rdata |
|---|---|---|---|---|
| 0 | www.example.com | IN | A | 10.1.2.3 |
| 207 | www.example.com | IN | A | 10.5.5.5 |
| 207 | www.example.com | IN | A | 10.5.5.6 |
| 211 | www.example.com | IN | A | 10.7.6.1 |

| Variant ID | Owner Name | Type | Inception | Expiration | Signature |
|---|---|---|---|---|---|
| 0 | www.example.com | A | 201206071234 | 201206141244 | AQOwxDlb... |
| 207 | www.example.com | A | 201206071234 | 201206141244 | RBMr8keEO... |
| 211 | www.example.com | A | 201206071234 | 201206141244 | W/uo7gk85... |

*Fig. 2*

SYSTEMS AND METHODS FOR PRE-SIGNING OF DNSSEC ENABLED ZONES INTO RECORD SETS

PRIORITY

Priority is claimed to U.S. Provisional Patent Application No. 61/800,405, entitled "Systems and Methods for Pre-Signing of DNSSEC Enabled Zones into Record Sets", filed Mar. 15, 2013, the contents of which are expressly incorporated by reference herein.

FIELD

The present teachings relate to systems and methods for pre-signing of DNSSEC enabled zones into record sets, and more particularly, to platforms and techniques for managing the generation of answers from domain name systems with pre-signed key signature data based on DNS system policies.

BACKGROUND

In the evolution of the domain name system (DNS) used to locate Web sites and other resources on the Internet and other networks, the issue of security has taken on increased importance over time. In response to evolving security needs, organizations in the industry have proposed and developed extensions to the baseline DNS protocol to permit the introduction of security measures in the delivery of DNS services. In general these known standards are referred to as DNS with security extensions, or DNSSEC.

In particular, the need has presented itself to allow users running a Web browser or other software to be assured that the Internet Protocol (IP) address delivered to them when attempting to navigate to a known universal resource locator (URL) is genuine, and represents the Web site they are trying to access. Bogus IP addresses can be delivered to unwitting users due to cache poisoning or other attacks on the DNS servers used to retrieve and serve the IP address of a given domain name, or other answers provided by the DNS system.

In terms of Web site deployment, many Web sites today consist of a number of hierarchical sections or partitions, each of which has a different extended domain name. For instance, a Web site related to sports news may have a root level such as SportsPage.com, and in addition a number of sections or "zones" dedicated to individual sports activities. Those topics might be reflected in domains such as Golf.SportsPage.com, Soccer.SportsPage.com, and so forth.

A user navigating within SportsPage.com can provide one or more questions or requests to the DNS system supporting that Web site, such as for an IP address, or for other information. The answer to the user's question may be generated from within various zones within the Web site. To ensure the user receives a valid answer, a DNSSEC-enabled domain requires a series of messages signed with a signature generated using public/private key information. While the DNSSEC protocol therefore supplies an authentication service to users navigating through Web properties, as the depth and hierarchical links of a domain's zones become more complicated, the burden on processing and bandwidth resources of the DNS system becomes great. That burden can reduce DNS responsiveness.

In addition, for Web site owners who wish to apply flexible DNS policies while using a DNSSEC arrangement, matters can be complicated even further. That is, an operator deploying a relatively rich Web site with a number of zones may wish to apply rules to individual requestors so that their DNS lookups or answers are directed to different servers, and/or the zones of the domain, based on the user's location, time and/or date, server loads, the user's device and/or software, the user's identity, costs, pricing, server availability, and/or based on other factors. Identifying information about the users, applying the appropriate policies, and then generating the necessary signatures that will allow their specific answer to be authenticated can likewise incur a penalty in terms of performance, and the user's perception of system responsiveness.

It may be desirable to provide methods and systems for pre-signing of DNSSEC enabled zones into record sets, in which a domain name system can accept an arbitrary set of policies from a domain owner, translate those policies into a set of pre-generated signed answers or other zone files, and transmit the signed answer to the user based on stored resource records, rather than answers which must be generated and/or signed on-demand.

DESCRIPTION OF DRAWINGS

The accompanying drawings, which are incorporated in and constitute a part of this specification, illustrate implementations of the present teachings and together with the description, serve to explain the principles of the present teachings. In the figures:

FIG. 2 illustrates a data structure for a zone file that can be used in systems and methods for pre-signing of DNSSEC enabled zones into record sets, according to various implementations;

DESCRIPTION

Implementations of the present teachings relate to systems and methods for pre-signing of DNSSEC enabled zones into record sets. More particularly, implementations relate to platforms and techniques for managing a DNS implementation which employs DNSSEC security. In that environment, platforms and techniques according to the present teachings can receive a set of arbitrary policies for DNS operation, by which requests to answer questions, such as to resolve domain names into valid IP addresses or others, can be carried out.

The DNS system can receive a set of policies from a domain name owner or operator, validate those policies against the internal operating policies of the DNS system itself, and incorporate the policies that can be used to generate a valid answer. The set of policies can also or instead include rules or policies supplied by the operator of the DNS system itself, for instance, to apply load balancing or other logic to the DNS infrastructure. The answers which will vary or differ based on policy variables can be generated and stored in a resource record set of a zone file, indexed by a variant identifier. The variant answers can be pre-signed with public/private key pairs, so that when new questions arrive at the DNS system, a valid answer which is already signed can be retrieved from the zone file table or other record, and transmitted to the requestor.

New domain name resolution requests can therefore be resolved more efficiently since signed data is not generated on-the-fly. Those operations can also be executed more securely, since public/private key data does not have to be distributed to a variety of servers supporting the DNS platform. Other advantages and benefits can be realized.

Reference will now be made in detail to exemplary implementations of the present teachings, which are illustrated in the accompanying drawings. Where possible the same reference numbers will be used throughout the drawings to refer to the same or like parts.

Figure 1:
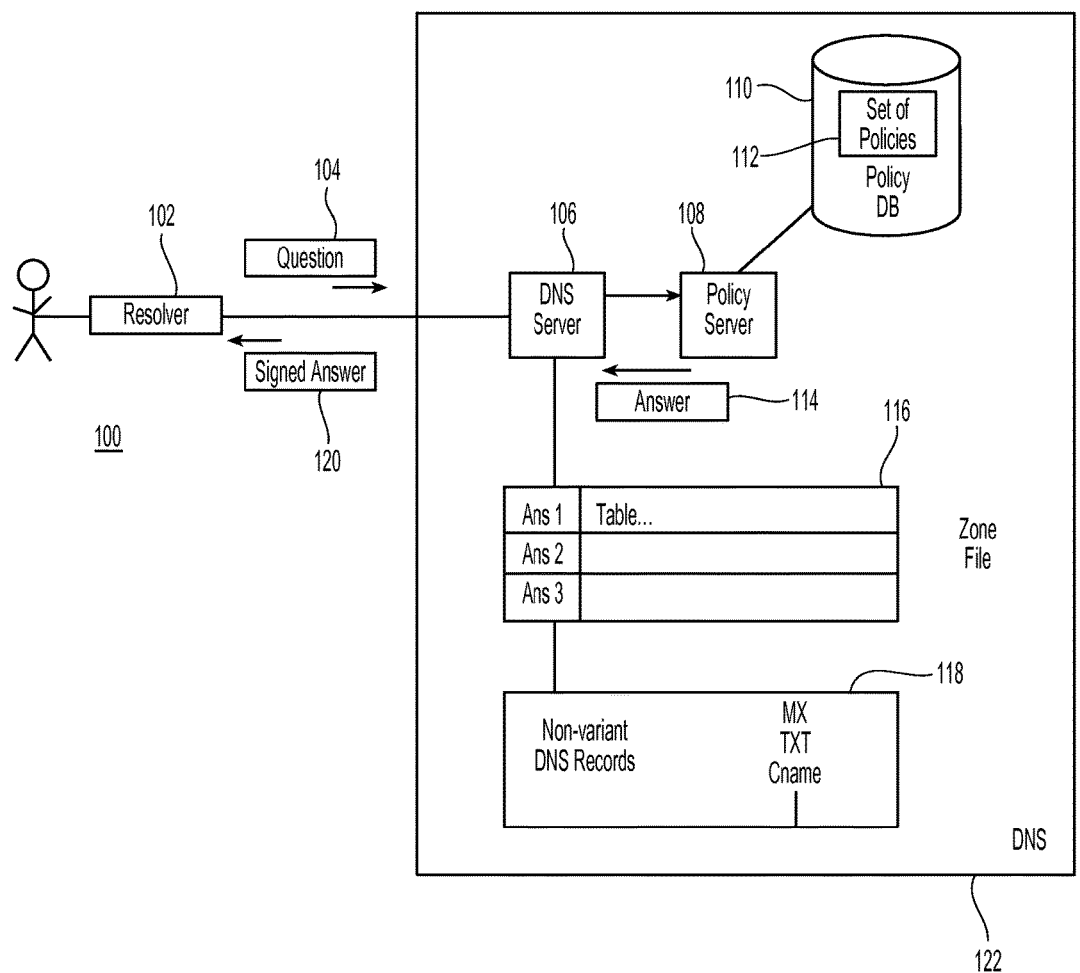
FIG. 1 illustrates an overall domain name environment which can be used in systems and methods for pre-signing of DNSSEC enabled zones into record sets, according to various implementations.

FIG. 1 illustrates an overall DNS environment 100 in which systems and methods for pre-signing of DNSSEC enabled zones into record sets can operate, according to aspects. In aspects as shown, the DNS environment can include a resolver 102 which communicates with a domain name system (DNS) 122, to communicate a question 104 and receive a signed answer 120. As used herein, the signed answer 120 can refer to an answer containing signed DNS records. The DNS 122 can be or include a server, set of distributed servers, cluster, cloud-based service, appliance, and/or other hardware, resource, platform, or element.

The question 104 can be or include any of a variety of inquiries, such as, for instance, a request for an Internet protocol (IP) address related to a given domain name, to a zone, and/or other sites or locations. The IP address can be in IPv4 (32 bit), IPv6 (128 bit), and/or other format. The question 104 can also or instead be a request for other information from the DNS 122, such as location information, certificate information, authority information, server information, network information, and/or other results or information. The resolver 102 can communicate with the DNS 122 via the Internet, and/or other public or private networks or channels. The resolver 102 can be operated by a number of parties, including for instance the owner or operator of a domain name, a systems administrator for those entities, or others.

The DNS 122 can be configured to receive the question 104 and generate the signed answer 120 consistent with the standards of DNS with security extensions (DNSSEC), as specified by the Internet Engineering Task Force (IETF) and/or other associated standards bodies. In general, the use of DNSSEC involves the use of an exchange of signed messages or data between servers supporting a given domain, zones associated with the domain, and/or other elements in a DNS network. Servers providing an answer to a DNS query can sign their answer using a private key, to transmit to a next server in the chain of trust to authenticate the information being provided. The recipients of the signed answer or other data can verify the authenticity of the data using a public key for the originating server.

The DNS 122 as illustrated can host or manage a DNS platform or service for various entities. For instance, the DNS 122 can provide DNS services for a third party subscriber wishing to have their DNS operations provided by an outside source. The DNS 122 can likewise be employed to support DNS services for an entity's own network, or can support DNS services under other arrangements.

The DNS 122 can in general incorporate a number of elements or resources to carry out DNS operations which are DNSSEC-enabled, while using a set of policies 112 to determine answers to incoming questions or requests that may be related to, or associated with, a domain name and/or a set of zones associated with the domain name. The DNS 122 can incorporate a DNS server 106 (or servers), which communicates with a policy server 108 to generate or retrieve an answer 114 to the question 104. The answer 114 can as noted be generated or retrieved based on the set of policies 112, which can be stored in a policy database 110 and/or other data store hosted in or associated with the DNS 122. According to aspects, the set of policies 112 can be applied to the question 104 and/or answer 114 to create a pre-generated set of information to respond to the question 104. That pre-generated information can be divided into information which differs or varies depending on variables and policies specified in the set of policies 112, and information which does not differ or vary depending on variables and policies specified in the set of policies 112.

The set of policies 112 can be or include a set of scripts or other logic, programming, conditions, or rules which determine the conditions under which the answer 114 to the resolver's question 104 is generated and served to the requesting user. The set of policies 112 can include geolocation rules, for instance specifying that an IP address for a user making a request with a certain geographic area can be directed to certain servers associated with the DNS 122. Rules based on the time of day, such as when question 104 is received, can also be applied. The set of policies 112 can further include rules based on load-balancing criteria to balance out the load on servers associated with the DNS 122. The set of policies 112 can likewise include other rules, tests, heuristics, or policies. For example, the set of policies 112 can include rules or logic such as those described in co-pending U.S. application Ser. No. 13/839,554 entitled "High Performance DNS Traffic Management," by Daniel James and Arunabho Das, filed Mar. 15, 2013, and assigned or under obligation of assignment to the same entity as this application, which application is incorporated by reference in its entirety.

The set of policies 112 can, in cases, be supplied by the owner or operator of a domain name supported by the DNS 122. The set of policies 112 can also or instead be specified by the owner or operator of the DNS 122, itself and/or by other users or sources.

After receiving and installing the set of policies 112, the DNS 122 can, in implementations, verify or validate those policies against the internal rules or policies of the DNS 122, to ensure that the policies provided by the resolver 102 and/or other user do not conflict with the internal operations of the DNS 122. According to further implementations, in cases where a resolver 102 and/or other user fails to supply a full set of necessary policies, the DNS 122 can apply default rules or policies for the operation of the associated domain name.

After the set of policies 112 are installed, the DNS 122 can use that set of rules or logic to generate answers related to a domain name and/or its related zones. According to aspects, and as shown in FIG. 1, the answers can be encoded in a zone file 116. The zone file 116 can be stored in the form of a table, indexed by an identifier (e.g., Answer 1, Answer 2, Answer 3 . . . as shown) for each possible answer based on the set of policies 112. In implementations, it may be possible to generate or know all possible answers to a question 104, given the set of policies 112 and associated domain name records for a domain. In instances, for example, the total number of answers may be relatively small, such as 5, 10, or another number of possible answers. A smaller number of answers can contribute to greater system responsiveness, but it will be understood that larger collections of answers can be generated and stored as well.

The answers developed by the DNS 122 can, as shown, be divided into two overall groups: one set that will differ or vary based on the set of policies 112 and/or other factors, and those that will not. The answers which vary can be stored, as noted, as a "variant answer" in the zone file 116 for retrieval when a question 104 calling for one of those dynamically selected answers is received. Those variant answers can be indexed or keyed based on a variant ID, and retrieved to be sent to the resolver 102 when a corresponding question 104 is received. The variant answer data can, for example, include different IP address values for different service locations, and/or include different aliases (CNAMES), as well as other information. Answers which do not vary can be stored in the non-variant DNS records 118. For instance, the set of non-variant DNS records can be or include, in a given instance for a domain name, data associated with mail exchange (MX) data, text (TXT) data, alias name (CNAME) data, or other types of data. It will be appreciated, though, that in other implementations, the noted types of data (MX etc.) can be incorporated in the variant answer information stored in the zone file 116, and/or other information can be stored in the non-variant DNS record 118.

With the question 104 received in 106, data is retrieved from 116 and 108 is used to select an answer 114 or constituent parts of answer 114) retrieved from the zone file 116 using the policy server 108. Data can instead or additionally be retrieved from 118. The data retrieved 116 and/or 118 can be combined and encoded in signed answer 120, which is returned to the resolver 102.

FIG. 2 illustrates an exemplary data structure that can be used in a zone file 116. In implementations as shown, the zone file 116 can encode or store a variety of information, including a variant ID 124 which can be used as a key or index into the table store in zone file 116. Other information, such as the owner name, class, type, record data (rdata), inception, and expiration can be recorded in the zone file 116. Zone file 116 can also include a signature 126 based on the key data that is associated with each variant answer identified by a variant ID 124. The signature 126 can be checked by the resolver 102 or other user using public key information to ensure that the signed answer 120 is authentic and can be relied upon. The signed answer 120 can thus be retrieved and transmitted to the resolver 102 without the need for generating the answer itself, or the signature 126 for the answer, on a spontaneous or on-the-fly basis.

Figure 3:
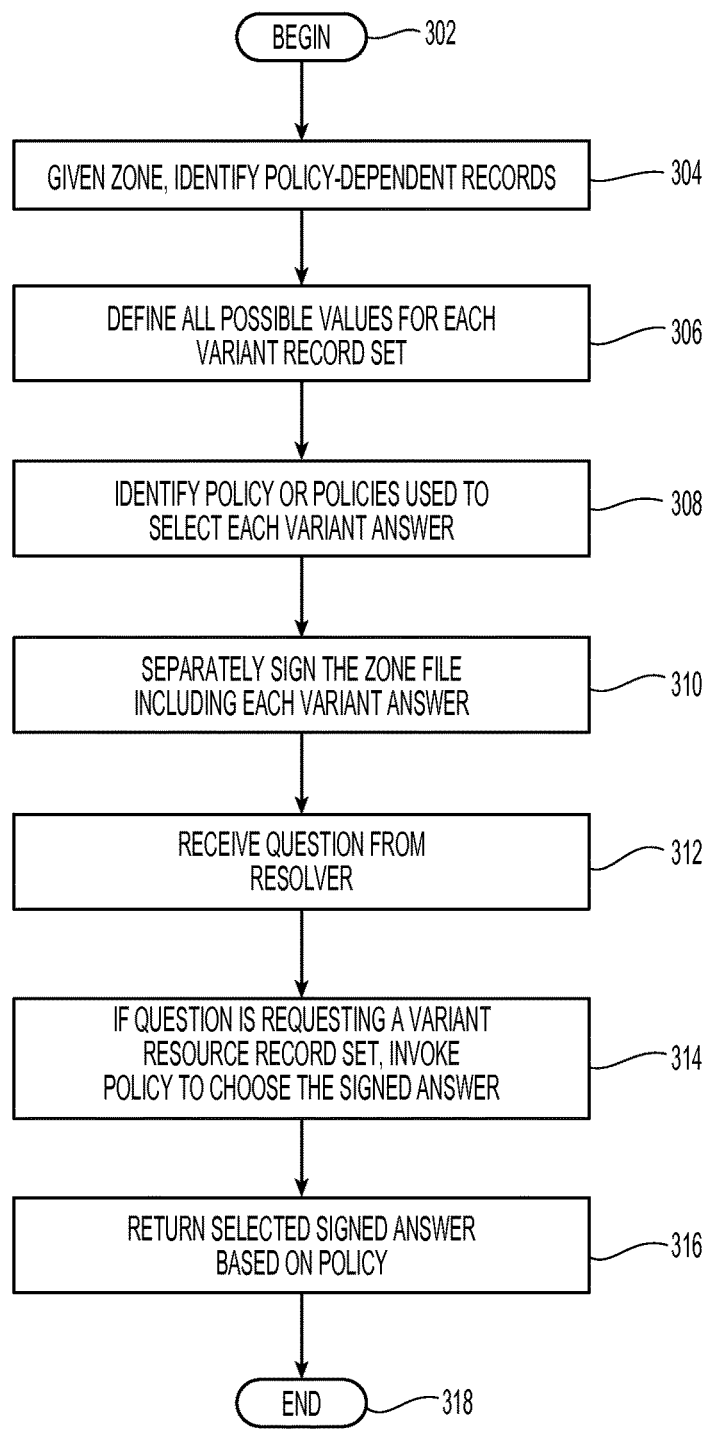
FIG. 3 illustrates a flowchart of policy validation, signed data generation, and other processing that can be used in systems and methods for pre-signing of DNSSEC enabled zones into record sets, according to implementations.

FIG. 3 illustrates a flowchart of policy conditioning, signed data pathway generation, and other processing that can be performed in systems and methods for pre-signing of DNSSEC enabled zones into record sets, according to aspects. In 302, processing can begin. In 304, the DNS 122 can, for a given or subject zone, identify policy-dependent records which will be variant or different based on the set of policies 112. In 306, the DNS 122 can define or generate all possible values for each variant record set produced by the application of the set of policies 112. In 308, the DNS 122 can identify the policy or policies used to select each variant answer, from the set of policies 112.

In 310, the DNS 122 can separately sign the zone file 116 including each variant answer produced by the set of policies 112. The signing of the zone file 116 can be carried using key data that is accessed offline, key data that is stored in a separate system, including specialized key data storage systems, or other stores or hosts. In 312, the DNS 122 can receive a question 104 from resolver 102, such as a request for an IP address, and/or other query or request. In 314, if the question 104 is determined by the DNS 122 to be requesting a variant resource record set (rather than non-variant DNS records 118), the DNS 122 can invoke an associated policy or policies in the set of policies 112 to choose or selected the signed answer 120. In 316, the DNS 122 can return the signed answer 120 to the resolver 102 based on the selected policy or policies. In 318, processing can repeat, return to a prior processing point, jump to a further processing point, or end.

Figure 4:
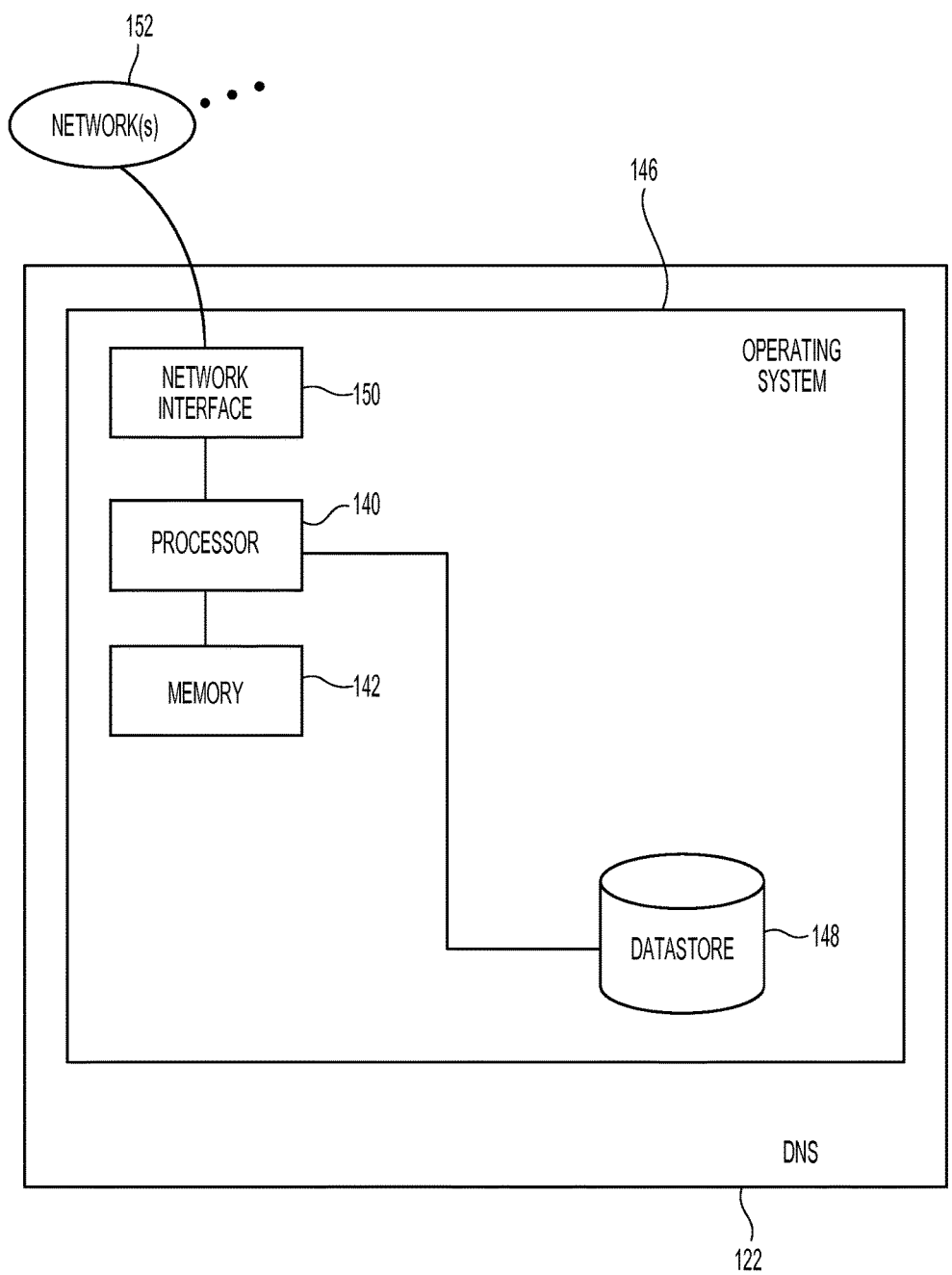
FIG. 4 illustrates exemplary hardware, software, and other resources that can be used in pre-signing of DNSSEC enabled zones into record sets, according to various implementations.

FIG. 4 illustrates various hardware, software, and other resources that can be incorporated in a DNS 122, according to implementations. In implementations as shown, the DNS 122 can comprise a platform including processor 140 communicating with memory 142, such as electronic random access memory, operating under control of or in conjunction with an operating system 146. The processor 140 in implementations can be incorporated in one or more servers, clusters, and/or other computers or hardware resources, and/or can be implemented using cloud-based resources. The operating system 146 can be, for example, a distribution of the Linux™ operating system, the Unix™ operating system, or other open-source or proprietary operating system or platform. The processor 140 can communicate with a data store 148, such as a database stored on a local hard drive or drive array, to access or store the zone file 116 or zone files, other DNS records, and/or subsets of selections thereof, along with other content, media, or other data. The processor 140 can further communicate with a network interface 150, such as an Ethernet or wireless data connection, which in turn communicates with the one or more networks 152, such as the Internet or other public or private networks. The processor 140 can, in general, be programmed or configured to execute control logic and to control various processing operations, including to process the question 104, set of policies 112, IP address information, and/or other data or information related to DNS operations under control of the DNS 122. In aspects, the resolver 102, as well as any zone server in the subject domain, can be or include resources similar to those of the DNS 122, and/or can include additional or different hardware, software, and/ or other resources. Other configurations of the DNS 122, the resolver 102, associated network connections, and other hardware, software, and service resources are possible.

The foregoing description is illustrative, and variations in configuration and implementation may occur to persons skilled in the art. For example, while implementations have been described in which one DNS 122 platform or element supports a given domain, in implementations, two or more domain name systems (DNSs) can be deployed to support a domain. Other resources described as singular or integrated can in implementations be plural or distributed, and resources described as multiple or distributed can in implementations be combined. The scope of the present teachings is accordingly intended to be limited only by the following claims.

What is claimed is:

1. A method of conducting domain name system (DNS) operations, comprising:

accessing, by a processor of a DNS device, a set of policies for operation of a DNS, wherein the DNS uses domain name system with security extensions (DNSSEC), and the DNS device supports a zone of a DNS network;

generating, by the processor, a set of answers to a plurality of questions associated with a set of domain names of the zone, wherein, based on the set of policies, a first question of the plurality of questions corresponds to a plurality of answers in the set of answers;
generating a set of signed answers from the set of answers and a set of key data;
storing the set of signed answers as records in a zone file;
receiving via the DNS network, a question from a resolver;
retrieving a signed answer from the stored set of signed answers based on the question received from the resolver and the set of policies, and
transmitting via the DNS network, the signed answer to the resolver,
wherein the records in the zone file comprise a plurality of records storing the plurality of answers corresponding to the first question, each of the plurality of records storing a respective one of the plurality of answers.

2. The method of claim 1, wherein accessing the set of policies comprises receiving the set of policies from a user associated with the set of domain names.

3. The method of claim 1, wherein accessing the set of policies comprises applying policies generated by the DNS.

4. The method of claim 1, wherein accessing the set of policies comprises installing a set of default policies.

5. The method of claim 1, wherein generating a set of signed answers comprises generating the set of signed answers using a set of public and private keys stored in the key data.

6. The method of claim 1, wherein the set of policies comprises at least one of the following:
a policy based on geo-location data,
a policy based on load balancing data,
a policy based on time of day information,
a policy based on authorization levels, and
a policy based on traffic management rules.

7. The method of claim 1, wherein generating a set of answers comprises generating a set of answers based on an Internet protocol (IP) address associated with the resolver and the set of policies.

8. The method of claim 1, wherein the set of answers comprises at least one of the following:
a set of Internet protocol (IP) data associated with the set of domain names,
ownership information associated with the set of domain names,
class information associated with the set of domain names,
inception information associated with the set of domain names, and
expiration information associated with the set of domain names.

9. The method of claim 1, further comprising updating the set of policies.

10. The method of claim 9, further comprising updating the set of answers based on the updated set of policies.

11. A system, comprising:
a network interface coupled with a resolver that transmits a question associated with a set of domain names for a zone, the domain name operating under a domain name system with security extensions (DNSSEC);
a domain name system (DNS) device supporting a set of zones of a DNS network, the DNS device comprising a processor and a memory device storing a set of instructions that, when executed by the processor, controls the DNS device to perform operations comprising:
communicating with the resolver via the network interface, the instructions comprising:
accessing a set of policies for operation of the domain name system (DNS);
generating a set of answers to a plurality of questions associated with the set of zones of a domain name, wherein based on the set of policies, a first question of the plurality of questions corresponds to a plurality of answers in the set of answers;
generating a set of signed answers from the set of answers and a set of key data;
storing the set of signed answers as records in a zone file;
receiving, via the DNS network, the question from the resolver;
retrieving a signed answer from the stored set of signed answers based on the question and the set of policies; and
transmitting, via the DNS network, the signed answer to the resolver,
wherein the records in the zone file comprise a plurality of records storing the plurality of answers corresponding to the first question, each of the plurality of records storing a respective one of the plurality of answers.

12. The system of claim 11, wherein accessing the set of policies comprises receiving a set of policies from a user associated with the domain name.

13. The system of claim 11, wherein accessing the set of policies comprises applying policies generated by the DNS.

14. The system of claim 11, wherein accessing the set of policies comprises installing a set of default policies.

15. The system of claim 11, wherein generating a set of signed answers comprises generating the set of signed answers using a set of public and private keys stored in the key data.

16. The system of claim 11, wherein the set of policies comprises at least one of the following:
a policy based on geo-location data,
a policy based on load balancing data,
a policy based on time of day information,
a policy based on authorization levels, and
a policy based on traffic management rules.

17. The system of claim 11, wherein generating a set of answers comprises generating a set of answers based on an Internet protocol (IP) address associated with the resolver and the set of policies.

18. The system of claim 11, wherein the set of answers comprises at least one of the following:
a set of Internet protocol (IP) data associated with the set of domain names,
ownership information associated with the set of domain names,
class information associated with the set of domain names,
inception information associated with the set of domain names, and
expiration information associated with the set of domain names.

19. The system of claim 11, wherein the processor is further configured to update the set of policies.

20. The system of claim 19, wherein the processor is further configured to update the set of answers based on the updated set of policies.

21. The method of claim 1, wherein:
the set of answers comprises variant answers and non-variant answers;
the variant answers vary based on the set of policies;
the non-variant answers do not vary;

pluralities of the variant answers correspond to respective questions of the plurality of questions;

each of the pluralities of the variant answers comprise all possible answers to the respective questions of the plurality questions given the set of policies and associated domain name records of the set of domain names;

the variant answers are indexed with respective variant IDs; and the plurality of answers corresponding to the first question of the plurality of questions comprise one of the pluralities of the variant answers.

22. The system of claim 11, wherein:

the set of answers comprises variant answers and non-variant answers;

the variant answers vary based on the set of policies;

the non-variant answers do not vary;

pluralities of the variant answers correspond to respective questions of the plurality of questions;

each of the pluralities of the variant answers comprise all possible answers to the respective questions of the plurality questions given the set of policies and associated domain name records of the set of domain names;

the variant answers are indexed with respective variant IDs; and the plurality of answers corresponding to the first question of the plurality of questions comprise one of the pluralities of the variant answers.

23. The system of claim 21, wherein the set of policies comprises at least one of the following:

a policy based on geo-location data, a policy based on time of day information, and a policy based on authorization levels.

24. The system of claim 22, wherein the set of policies comprises at least one of the following:

a policy based on geo-location data, a policy based on time of day information, and a policy based on authorization levels.

* * * * *